United States Patent
Swett

(10) Patent No.: US 9,581,715 B1
(45) Date of Patent: Feb. 28, 2017

(54) ACOUSTIC HYPERLENS FOR THRU-CASING ULTRASONIC SENSOR

(71) Applicant: BAKER HUGHES INCORPORATED, Houston, TX (US)

(72) Inventor: Dwight W. Swett, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 15/040,677

(22) Filed: Feb. 10, 2016

(51) Int. Cl.
*G01V 1/44* (2006.01)
*E21B 47/00* (2012.01)
*G10K 11/30* (2006.01)

(52) U.S. Cl.
CPC ............ *G01V 1/44* (2013.01); *E21B 47/0005* (2013.01); *G10K 11/30* (2013.01)

(58) Field of Classification Search
CPC ........ G01V 1/44; G10K 11/30; E21B 47/0005
USPC .......................................................... 181/104
See application file for complete search history.

(56) References Cited

U.S. PATENT DOCUMENTS

| | | | |
|---|---|---|---|
| 2009/0126464 A1* | 5/2009 | Perlov ................... | G10K 11/30 73/40.5 A |
| 2009/0213690 A1* | 8/2009 | Steinsiek .............. | B06B 1/0629 367/35 |
| 2011/0080803 A1* | 4/2011 | Vu .......................... | G01V 1/46 367/32 |
| 2011/0080804 A1* | 4/2011 | Vu .......................... | G01V 1/46 367/32 |
| 2011/0080805 A1* | 4/2011 | Vu .......................... | G01V 1/46 367/32 |
| 2011/0209940 A1* | 9/2011 | Daraio .................. | F41H 11/136 181/139 |
| 2013/0030705 A1 | 1/2013 | Pei et al. | |
| 2013/0142009 A1* | 6/2013 | Chang ................. | G01S 15/8997 367/7 |
| 2015/0228269 A1* | 8/2015 | Semperlotti ........... | G10K 11/30 181/176 |
| 2015/0377661 A1* | 12/2015 | Edwards .............. | G01D 18/002 702/94 |

FOREIGN PATENT DOCUMENTS

WO 2013089683 A1 6/2013

* cited by examiner

*Primary Examiner* — Forrest M Phillips
(74) *Attorney, Agent, or Firm* — Mossman, Kumar & Tyler PC

(57) ABSTRACT

An apparatus for investigating a subsurface volume may include an acoustic transducer disposed in an enclosure and generating acoustical signals, an electronics assembly disposed in the enclosure and controlling the acoustic transducer, and a lens assembly. The lens assembly may be disposed in the enclosure and next to the acoustic transducer. The lens assembly may be formed of a plurality of cells. Each cell may be formed as a column oriented transverse to a direction of travel of the acoustical signals. Each cell may have a hub, a plurality of spokes radiating from the hub, and a plurality of fingers circumferentially distributed around the hub. The hub, spokes, and fingers may be oriented to cause the acoustic waves to travel at a different speed in each of three orthogonal directions. A related method uses the apparatus in a wellbore.

14 Claims, 11 Drawing Sheets

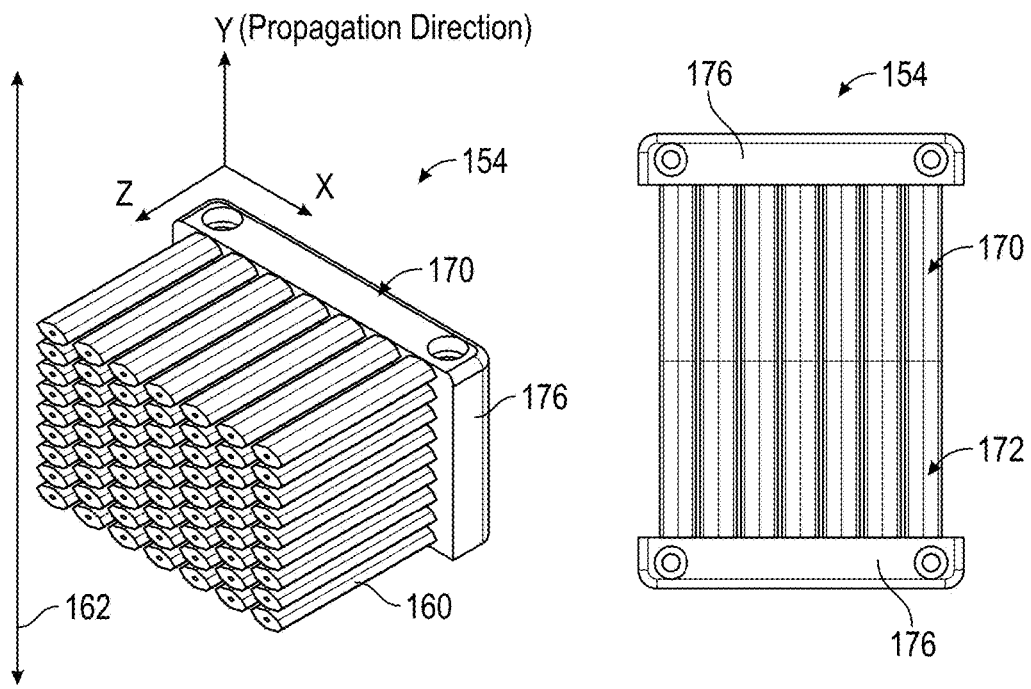
FIG. 9A          FIG. 9B
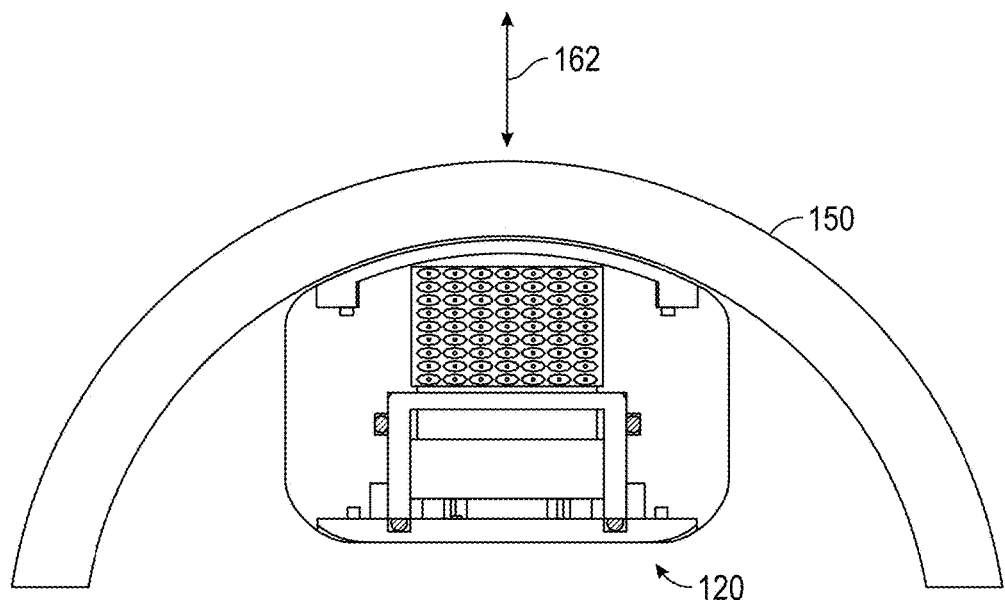
FIG. 10

ACOUSTIC HYPERLENS FOR THRU-CASING ULTRASONIC SENSOR

FIELD OF THE DISCLOSURE

This disclosure relates to acoustic sensors and methods of making and using such acoustic sensors in various tools, including acoustic logging tools.

BACKGROUND OF THE DISCLOSURE

Downhole acoustic logging tools, which are used to investigate subsurface features, can include one or more acoustic transmitters or sources and a number of acoustic receivers. These tools may also include a transceiver that can function as a transmitter and a receiver. In either case, the transmitters emit acoustic energy into the subsurface environment surrounding the wellbore. The acoustic signals are reflected by interfaces associated with the wellbore, well structures, and/or the formation. The reflected acoustic signals are detected by the receivers in the logging tool and processed to provide estimates of one or more properties of the wellbore, well structures, and/or the formation. The present disclosure provides acoustic sensors that utilize a metamaterial lens to manipulate such acoustic waves.

SUMMARY OF THE DISCLOSURE

In aspects, the present disclosure provides a cell for manipulating an acoustic wave. The cell may include a plurality of spokes radiating from a hub. Each spoke may have a plurality of junctures and a plurality of fingers may be circumferentially distributed around the hub. At least one finger is connected at each juncture.

In still further aspects, the present disclosure provides an acoustic tool. The acoustic tool may include a transducer configured to generate and detect an acoustic wave and a lens. The lens may be spaced-apart from the acoustic source. The lens may have a planar surface bounded by a plurality of edges. The acoustic wave enters the lens via at least one the edges and travels along an axis that is parallel to the planar surface. The lens may include at least one lens element having a plurality of spokes radiating from a hub. Each spoke may include a plurality of fingers that are circumferentially distributed around the hub. The hub and the plurality of spokes may be planar members arranged parallel to the planar surface.

In aspects, the present disclosure provides an apparatus for investigating a subsurface volume. The apparatus may include an enclosure configured to be conveyed along a wellbore, an acoustic transducer disposed in the enclosure and generating acoustical signals, an electronics assembly disposed in the enclosure and controlling the acoustic transducer, and a lens assembly. The lens assembly may be disposed in the enclosure and next to the acoustic transducer. The lens assembly may be formed of a plurality of cells. Each cell may be formed as a column oriented transverse to a direction of travel of the acoustical signals. Each cell may have a hub, a plurality of spokes radiating from the hub, and a plurality of fingers circumferentially distributed around the hub. The hub, spokes, and fingers may be oriented to cause the acoustic waves to travel at a different speed in each of three orthogonal directions.

In aspects, the present disclosure provides a method for investigating a subsurface volume. The method may include positioning an acoustic tool in a wellbore. The acoustic tool may include an enclosure configured to be conveyed along a wellbore, an acoustic transducer disposed in the enclosure and generating acoustical signals, an electronics assembly disposed in the enclosure and controlling the acoustic transducer, and a lens assembly. The lens assembly may be disposed in the enclosure and next to the acoustic transducer. The lens assembly may be formed of a plurality of cells. Each cell may be formed as a column oriented transverse to a direction of travel of the acoustical signals. Each cell may have a hub, a plurality of spokes radiating from the hub, and a plurality of fingers circumferentially distributed around the hub. The hub, spokes, and fingers may be oriented to cause the acoustic waves to travel at a different speed in each of three orthogonal directions. The method may include directing the acoustic waves through an adjacent aberrating media that at least partially blocks the direction of travel of the acoustic waves and into the volume of interest.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 9A-B illustrate a lens assembly made in accordance with the present disclosure;

FIG. 10 illustrates an end view of the FIG. 8 embodiment;

DETAILED DESCRIPTION

Figure 1:
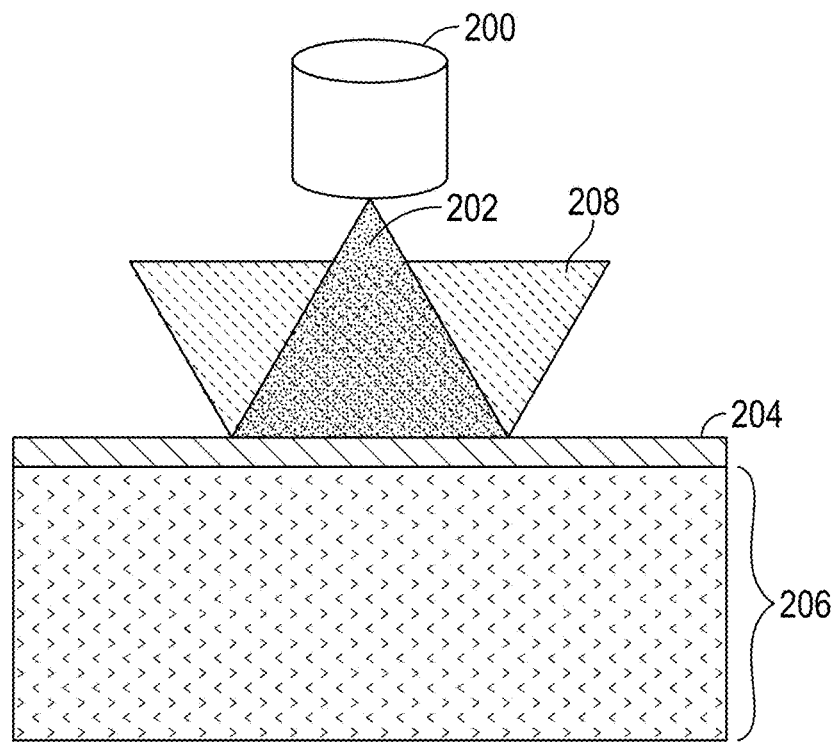
FIG. 1 is a schematic diagram of a prior art acoustic tool having an emitted acoustic signal distorted by an aberrating media.

In aspects, the present disclosure relates to acoustic devices and related methods for investigating a volume of interest when a signal transmission path to that volume of interested is partially or completely obstructed by an aberrating media. In aspects, the present disclosure also relates to acoustic devices and related methods for investigating a volume of interest when a signal transmission path from that volume of interested is partially or completely obstructed by an aberrating media. Referring to FIG. 1, there is shown a source 200 for generating a signal 202, which may be sonic or ultrasonic. An aberrating media 204 may partially or completely obstruct the path of the signal 202 to a volume of interest 206. By obstruct, it is meant that the media 204 has one or more properties or characteristics that can block, distort, refract, reflect or otherwise undesirably affect the signal 202. By way of example, the signal 202 is shown as having a reflection 208.

Figure 2:
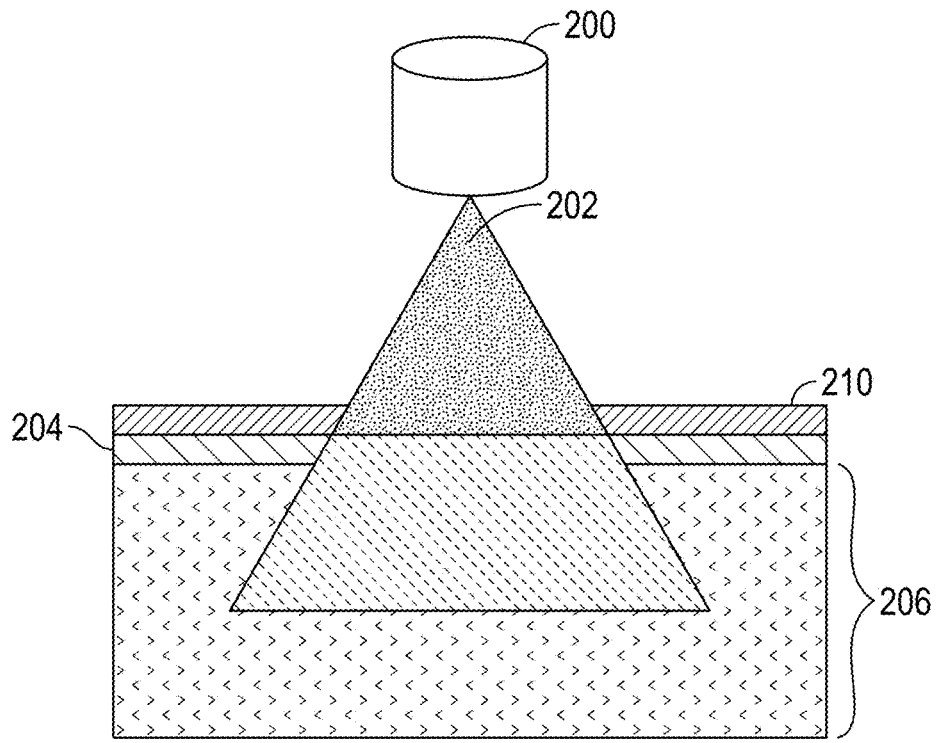
FIG. 2 is a schematic diagram of an acoustic tool in accordance with the present disclosure that emits an emitted acoustic signal that is distorted less by an aberrating media vis-à-vis the FIG. 1 acoustic tool.

Referring to FIG. 2, embodiments of the present disclosure position a lens 210 formed of an acoustic metamaterial between the source 200 and the aberrating media 204. The lens 210 is shaped and configured to manipulate the signal 202 in a manner that minimizes undesirable effects in the signal 202 due to the aberrating media 204. Specifically, the lens 210 may have anisotropic properties and may transmit longitudinal acoustic waves at a different speed in each of three orthogonal directions. The metamaterial making up the lens 210 may also deform with a different bulk moduli in each of the same three orthogonal directions. As a result, the lens 210 may be characterized by an anisotropic density tensor (diagonalized) and an anisotropic bulk modulus tensor having terms that are highly frequency dependent. In certain instances, these characteristics may generate an unnatural manipulation of incident acoustic energy that enhances evanescent, or rapidly disappearing, wave vector components of incident energy. This manipulation of acoustic energy can lead to the formation of complementary or quasi-complementary wave vectors that transmit the acoustic energy through an adjacent aberrating media with minimal loss or distortion relative to the incident energy.

The characteristics of such metamaterials derive from the basic dynamic mechanism of resonances, occurring in aggregate, to affect the creation of material properties beyond the bounds of Nature. In the particular case of acoustic metamaterials, these characteristics begin directly from the frequency response behavior of the two basic material parameters: effective mass density and effective bulk modulus. Both of these material parameters can take on negative attributes and even anisotropic behavior in the presence of particular types of resonance transition zones, specifically within proximity of anti-resonances. These anisotropic and negative properties can give rise to a wide range of spectral features within certain frequency bands, including negative refraction and hyperlensing, which can open possibilities for beam focusing and amplification in flat lenses. Actions such as focusing and amplification will be generally referred to as manipulating an acoustic wave.

Negative index properties arising from unit cell resonance within the frequency band may occur over a very narrow spectral bandwidth, the range of which is an effect of the resonance characteristics of the unit cell and the properties of the matrix and/or background fluid. In order to affect these negative properties over a broader frequency range, a multitude of compatible resonances in the elemental cell must couple constructively. This can be achieved through the metamaterial unit cell designs of the present disclosure.

There are several factors determining whether a particular unit cell design can affect the dispersion characteristics of a propagating wave to the extent of exhibiting anisotropic and negative index properties behavior necessary for hyperlensing. One particularly relevant factor is the creation of an aggregate of resonances in the transmission coefficient spectra that will couple to form a wide band of wave manipulation in the frequency range of interest. Whether the frequency band formed from the aggregate will give rise to anisotropic and negative index responses is a function of other properties of the resonance couplings. The extent to which a unit cell design exhibits significant acoustic impedance mismatch, absorption loss, and/or significant magnitude of bulk modulus are dominant influences, since any one of these can negate the hyperlensing effect in the frequency band. Cells according to the present disclosure may be referred to as elemental components in the superlens or hyperlens, depending on their characteristics.

Figure 3:
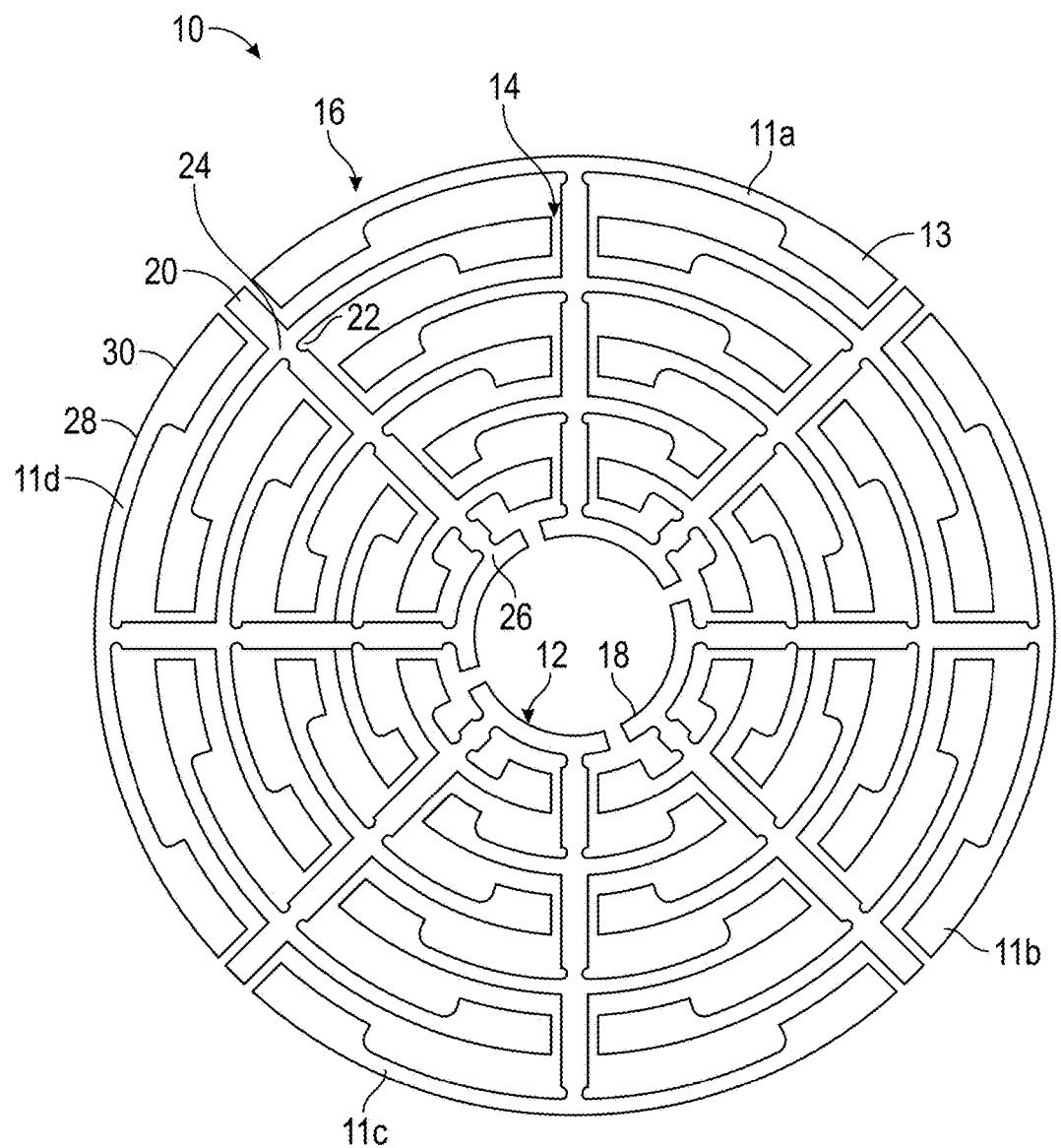
FIG. 3 is a schematic diagram of an exemplary circular cell according to embodiments of the disclosure.

Referring to FIG. 3, there is shown an exemplary metamaterial cell 10 for manipulating an acoustic wave in accordance with the present disclosure. Generally speaking, the cell 10 is a platen and disc like member. The cell 10 has two opposing planar surfaces that are parallel. As illustrated, the visible planar surface 13 is parallel with the paper. The distance between the two surfaces, or thickness, may be in the range of 1 millimeter to 100 millimeter. The diameter of a circle enclosing the cell 10 may be in the range of 1 millimeter to 5 millimeter. These dimensions are generally selected to allow phenomena such as resonances to have a measurable influence on the behavior of the cell 10 and affect wave manipulation in the particular frequency ranges of interest. The cells, such as cell 10, of the present disclosure may be formed of metals or non-metals. Suitable metals include, but are not limited to, steel, platinum, tungsten, gold, and exotic options such as iridium, with the important material property for acoustic wave manipulation being the mass density of the metal.

One non-limiting embodiment of a cell 10 may include a hub 12, a plurality of spokes 14 radiating from the hub 12, and a plurality of concentrically arranged leaves 16.

The hub 12 acts as a central support structure for the spokes 14. In the embodiment shown, the hub 12 is formed of four separate segments, an illustrative segment being labeled with numeral 18. The hub 12 may be circular or have any other suitable geometric shape. Also, while four segments 18 are shown, the hub 12 may be formed as a single integral body or have two or more segments 18. Each segment 18 is physically connected to one or more spokes 14.

The spokes 14 provide the structure for supporting the leaves 16. An illustrative spoke is labeled with numeral 20. The spoke 20 may be formed as an elongated bar having one or more necks 22. A neck 22 is a section of the spoke 20 that has a cross-sectional area that is smaller than the immediately adjacent cross-sectional areas. Thus, the spoke 20 is more flexible at the necks 22 and can bend, twist, or otherwise deform more easily at the necks 22 than at other locations along the spoke 20. In one arrangement, the necks 22 are formed immediately adjacent to and radially inward of each juncture 24 between the spoke 20 and the leaf 16. Also, a neck 22 may be immediately radially outward of a juncture 26 between the spoke 20 and the hub 12.

Each of the leaves 16 may include a circumferentially distributed array of fingers 28 arranged in the form of a circle. Each finger 28 is cantilevered from the juncture 24. While two fingers 28 are shown at each juncture 24 with an orientation transverse to the spoke 20, greater or fewer fingers 28 and different orientations may be used. The finger 28 may be a curved member that includes one or more enlarged sections 30. An enlarged section 30 has more mass than an immediately adjacent section of the finger 28. The increased mass is formed by providing the enlarged section 30 with a larger width than other sections of the finger 28. Thus, there may be an asymmetric mass distribution along the length of the finger 28. To interleave the fingers 28, the radial positions of the finger 28 are staggered for each successive spoke 14. Thus, a finger 28 of one spoke 14 may nest radially between two fingers 28 of an adjacent spoke 14. While six leaves 16 are shown, greater or fewer leaves 16 may be used.

The cell 10 of FIG. 3 has four segments 11a-d. Each segment 11a-d has two spokes 14 radiating from a hub segment 18. Each spoke 14 has three sets of fingers 28. Each set has two fingers 28a,b. The fingers 28 are circumferentially distributed to form six leaves 16. It should be noted that the four segments 11a-d are structurally independent with one another. While the elements making up each of the segments 11a-d have been described separately, it should be understood that each segment 11a-d may be manufactured as a unitary body as opposed to being assembled from discrete components. It should also be noted that while four segments are depicted, the cell 10 may use fewer or greater number of segments.

The resonances and anti-resonances within the cell 10 are affected by the interaction of the various structural features through the matrix or background fluid medium described above. Thus, the number, size, shape, and orientation of features such as the spokes 14, leaves 16, fingers 28, and enlarged sections 30 influence where and to what extent resonances and anti-resonances occur and how they complement or negate one another in affecting manipulation and control of the incident acoustic wave.

Figure 4:
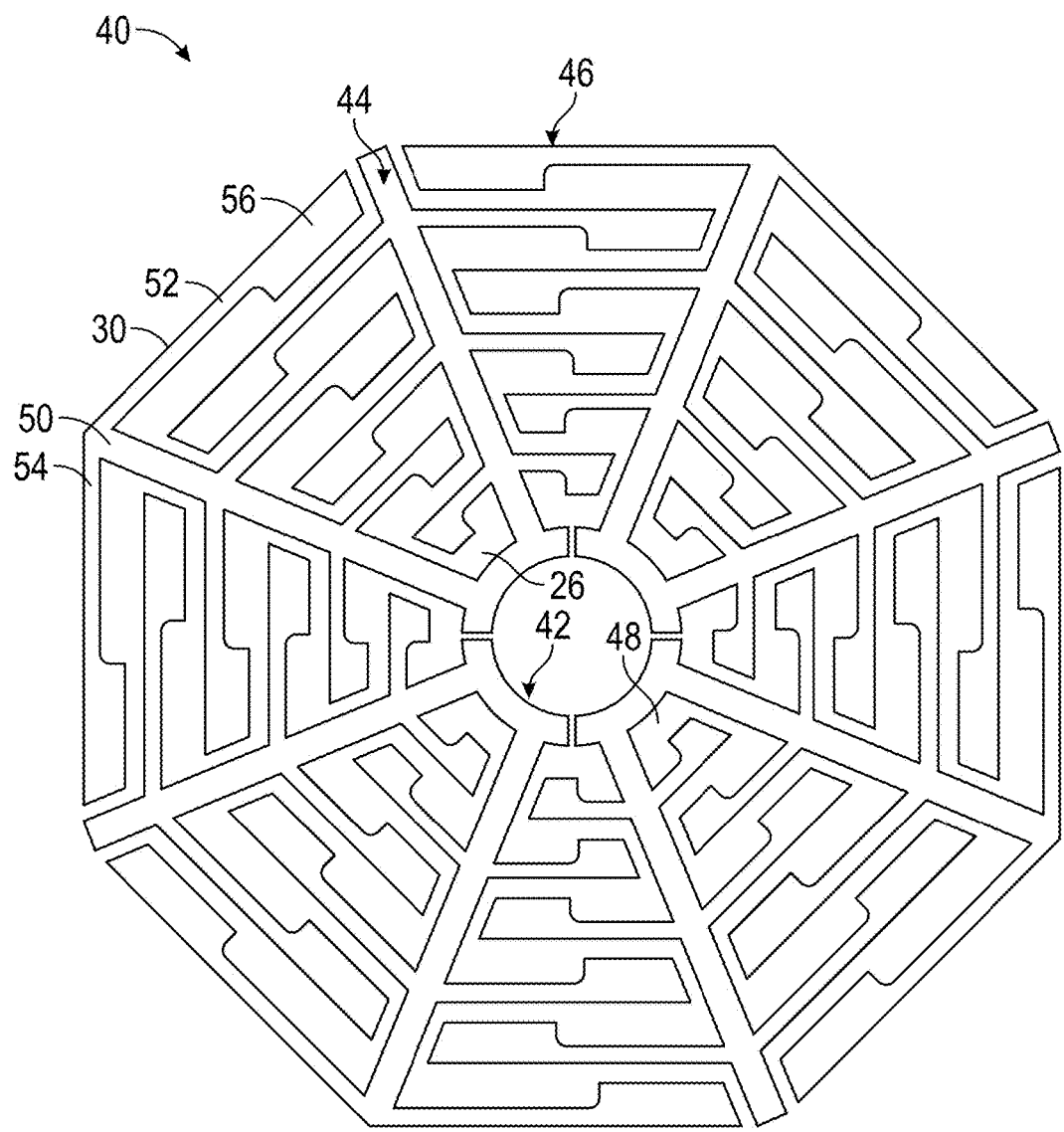
FIG. 4 is a schematic diagram of an exemplary octogonal cell according to embodiments of the disclosure.

Referring to FIG. 4, there is shown another embodiment of a cell 40 for manipulating an acoustic wave. The general shape and dimensions of the cell 40 is similar to those of cell 10 (FIG. 3). The cell 40 may include a hub 42, a plurality of spokes 44 radiating from the hub 42, and a plurality of concentrically arranged leaves 46. The cell 40 is similar to the cell 10 of FIG. 1 in many aspects. The variations of the cell 40 are discussed below.

As before, the spokes 44 provide the structure for supporting the leaves 46. An illustrative spoke is labeled with numeral 50. In this embodiment, the spoke 50 may be formed as an elongated bar that does not include any reduced cross-sectional areas. Also, the leaves 46 may include a circumferentially distributed array of fingers 52, with each finger 52 being cantilevered from a juncture 54. In this arrangement, the fingers 52 are straight members that include one or more enlarged sections 56.

In FIG. 4, the leaves 46 are arranged as a plurality of concentric polygons. In the illustrated arrangement, the each of the leaves 46 has an octagon shape. However, other polygon shapes may be used. As before, the fingers 52 are interleaved by staggering the radial positions of the fingers 52 for each successive spoke 44. The cell 40 of FIG. 2 has four segments configured in the same manner as the cell 10 of FIG. 1. However, any number of segments may be used.

Figure 5:
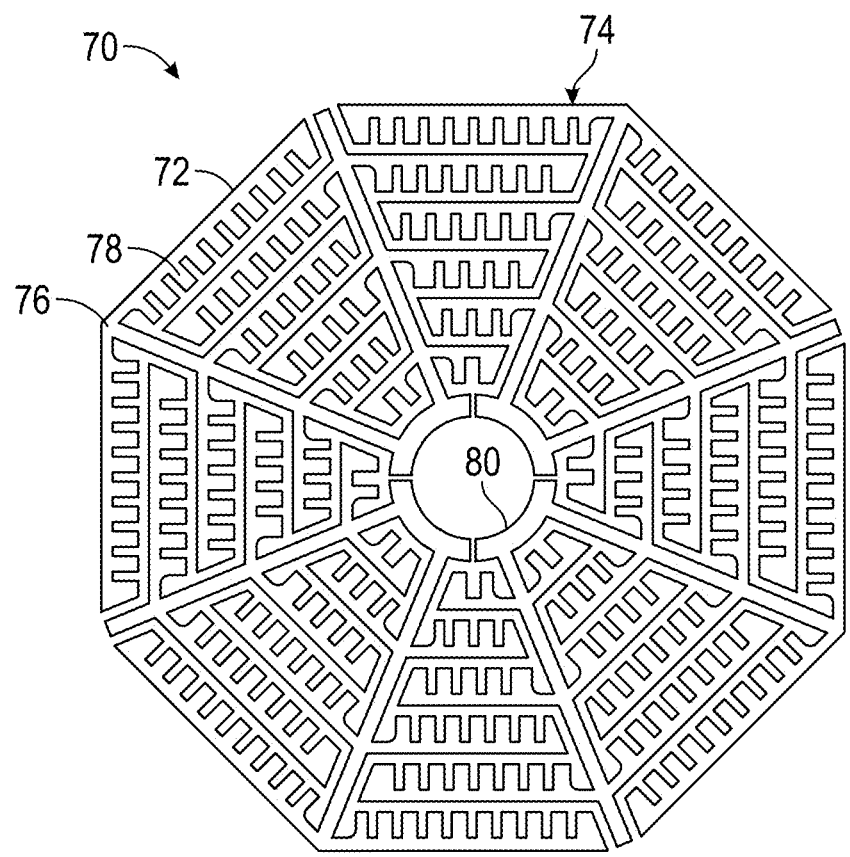
FIG. 5 is a schematic diagram of an exemplary cell according to embodiments of the disclosure that uses fingers with projections.

Referring to FIG. 5, there is shown another embodiment of a cell 70 for manipulating an acoustic wave. In a manner previously discussed, the fingers 72 of each leaf 74 are cantilevered from a spoke 76. In this embodiment, the fingers 72 have projections 78 that are oriented transverse to the fingers 72. Each of the projections 78 may be tab or bar like elements that can move independently relative to one another. By moving, it is meant bending, twisting, vibration, etc. While the projections 78 are shown projecting radially inward to a hub 80, it should be appreciated that the fingers 72 may be arranged to have the projections 78 project radially outward, or both.

The shape, size, number, and orientation of the projections 78 within each leaf 74 and between the leaves 74 may be varied in order to influence the resonant behavior of the cell 70. Thus, for instance, the projections 78 may be of different sizes along a finger 72 and each of the fingers 72 may have a different number of projections 78.

Further, the cells according to the present disclosure need not be symmetric or quasi-isotropic as shown in FIGS. 3-5.

Certain embodiment of the present disclosure may incorporate anisotropy in the shape factor to influence the bandwidth and hyperlensing effect of negative index resonant bandwidths formed by a cell. In one methodology, anisotropy may be applied by invoking geometry shaping transformations that maintain the invariance of the Helmholtz wave equation; e.g., a Joukowsky shaping transformation. For instance, the transformation may be described by the relation:

$$\xi = Z + \frac{b^2}{Z}$$

with the original cell coordinates:

$Z = x + iy$ and the transformed (shaped) cell coordinates:

$\xi = u + iv$

A Joukowsky shaping may transform the FIG. 4 octagonal cell boundary that can be circumscribed by a circle of radius R into a shaped cell geometry that can be circumscribed by the ellipse with shaping factor S=a/b where a and b are the elliptical dimensions collinear with the x and y axes, respectively. All remaining coordinates in the original interleaf cell geometry transform according to the same shaping factor S. Therefore, the Joukowsky transformation for an octagonal interleaf cell is:

$$[u + iv] = x\left[\frac{2S}{S+1}\right] + iy\left[\frac{2}{S+1}\right]$$

Figure 6:
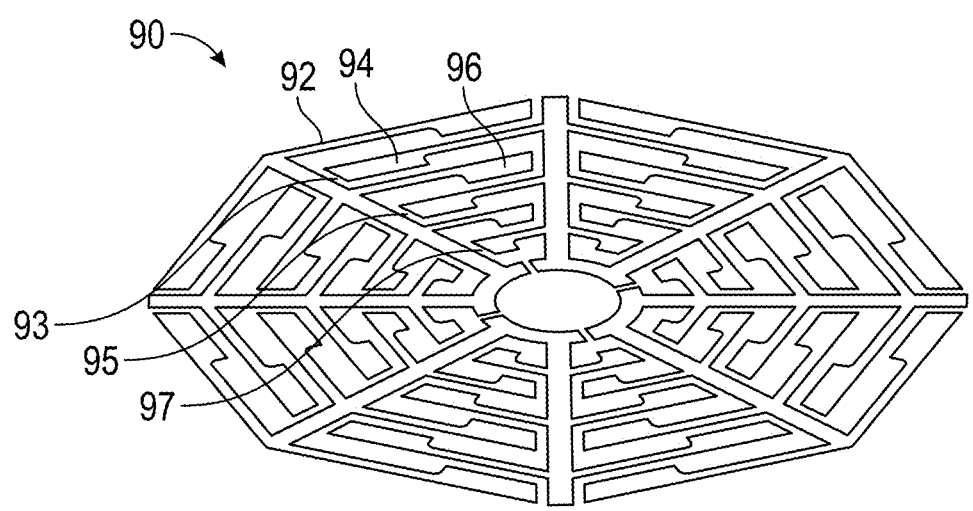
FIG. 6 is a schematic diagram of an exemplary octogonal cell resulting after a shaping transformation of the FIG. 3 embodiment.

These equations may be used to transform the 2D geometrical [x,y] coordinates of the cross-section for the quasi-isotropic cell illustrated previously in FIG. 4 with an anisotropic Joukowsky transformation with shape factor S=2 anisotropy in the cell shape. The resulting anisotropic cell 90 is shown in FIG. 6. The S=2 anisotropy is merely one illustrative value. One feature of the anisotropic shaping is that a thickness of at least two fingers varies non-linearly along the plane on which a cell lies. For example, the thickness of fingers, 92, 94, and 96 are different and the difference is mathematically non-linear. The comparison of thickness may be done by selecting the same feature (e.g., an enlarged section) and measuring a distance along the same location along the same axis. For instance, the edges 93, 95, and 97 may be used as a measure of the thickness of the transformed sections of the fingers. An anisotropic shaping may also be applied to the cells of FIGS. 3 and 5 or other cell configurations according to the present disclosure.

Figure 7:
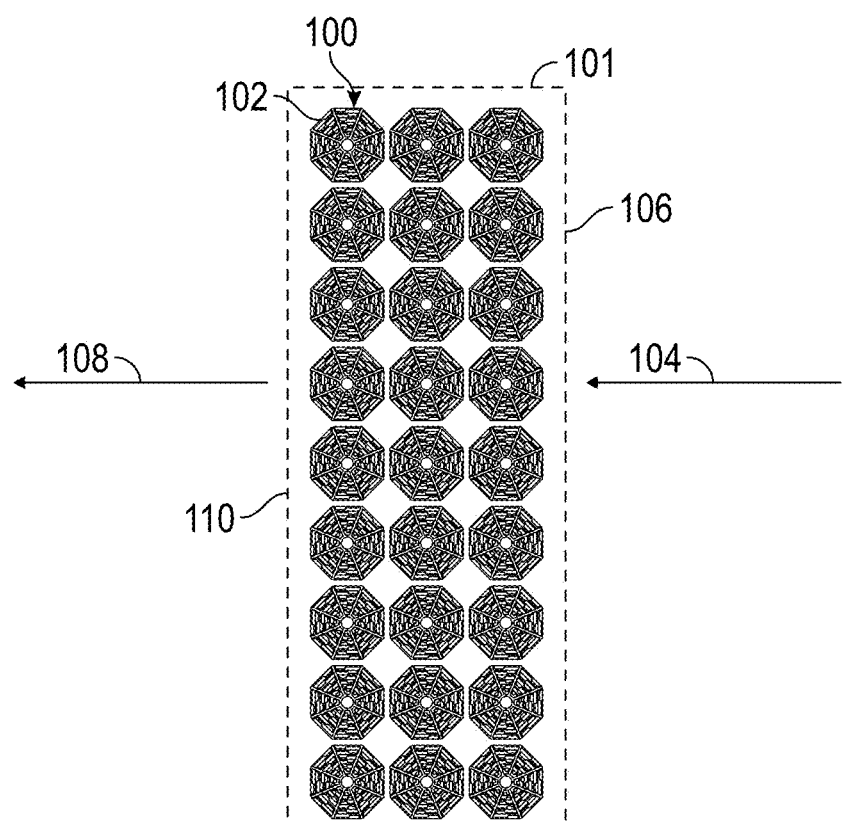
FIG. 7 illustrates a lens that includes cells made in accordance with embodiments of the present disclosure.

Referring to FIG. 7, there is shown a lens 100 having a plurality of cells 102. While the cells 102 are depicted as the same shape of the cells of FIG. 4, the lens 100 may include any cell configuration according to the present disclosure. The cells 102 are arranged edge-to-edge and have planar surfaces aligned co-planar with one another; e.g., each has a planar surface parallel with the paper. An acoustic wave 104 enters the lens 100 principally through an edge 106. The acoustic wave 104 travels through the lens 100 in a direction that is parallel with the plane along which all of the cells 102 lie. The cells 102 of the lens 100 manipulate the acoustic wave 104 such that a manipulated wave 108 exits from an edge 110 of the lens 100. In one non-limiting embodiment, a substrate 101 may be used as a support from which each of the cells 102 project. For example, the cells 102 may be grown from the substrate 101 such that the cells 102 and substrate 101 are integral. For instance, the substrate 101 may be a wafer or a plate. The cells 102 and the structurally independent features making up each cell 102 may project from the substrate 101 in a cantilever fashion.

Figure 8:
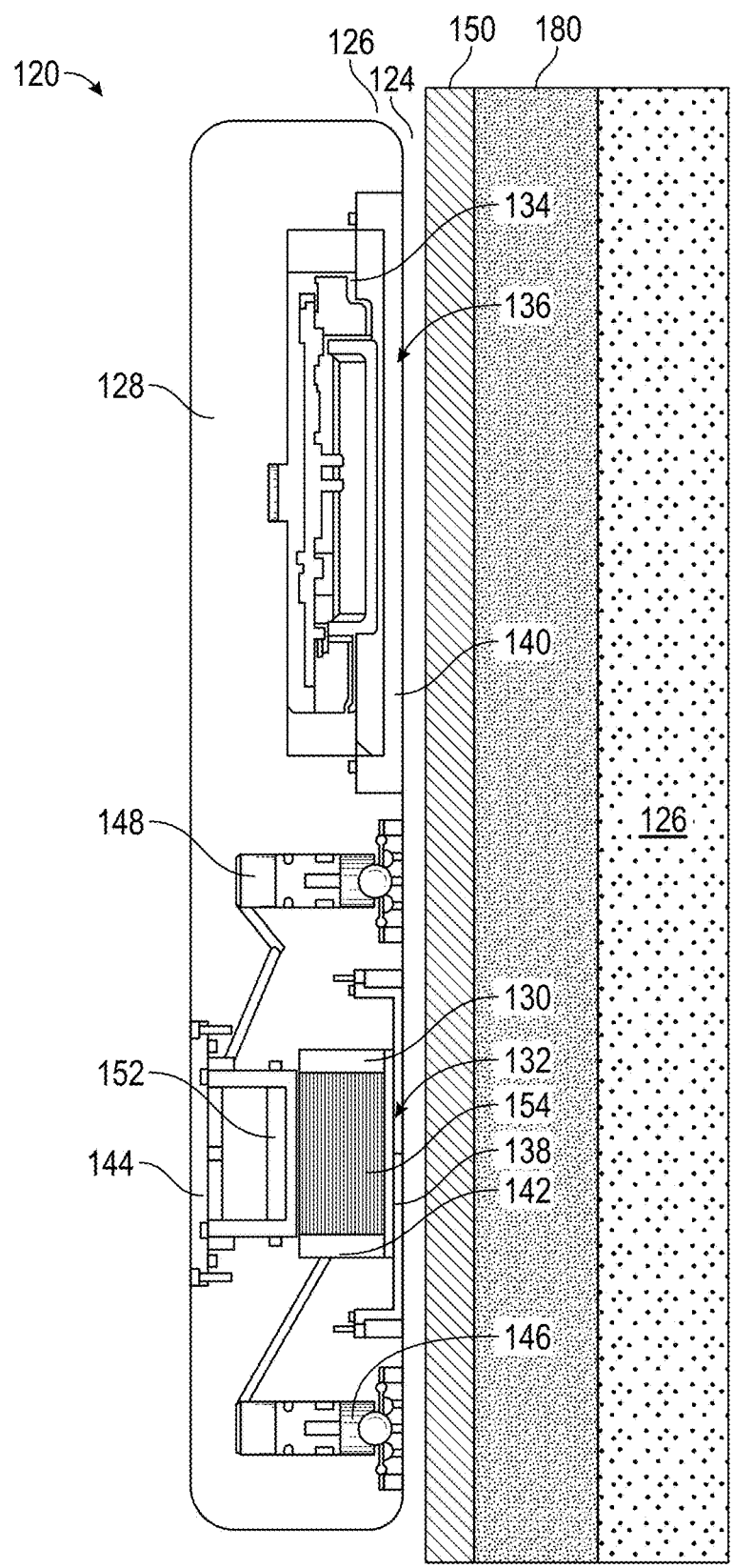
FIG. 8 illustrates an acoustic tool using cells made in accordance with the present disclosure and disposed in a borehole intersecting an earth formation in which an aberrating media obstructs a travel path to a volume of interest.

Referring to FIG. 8, there is shown one embodiment of an acoustic tool 120 according to the present disclosure. The tool 120 may be conveyed by a suitable conveyance device (not shown) along a borehole 124 drilled in an earthen formation 126. The conveyance device may be a non-rigid carrier such as a wireline, e-line, slick-line, or coiled tubing, a rigid carrier such as drill pipe, a drop tool, or an autonomous device. In one non-limiting embodiment, the tool 120 includes an enclosure 128 that has an acoustic source cavity 130 that receives an acoustic source assembly 132 and an electronics cavity 134 that receives an electronics assembly 136. A window 138 seals and encloses the acoustic source assembly 132 in the acoustic source cavity 130. The window 138 may be constructed and formed to have similar acoustic impedance with the fluid filling the lens cavity 142; e.g., fabricating the window from Teflon material and using pure water as the lens cavity fluid. A cover 140 seals and encloses the electronics assembly 136 within the electronics cavity 134. The acoustic source cavity 130 may have a lens section 142 and a source section 144. Pressure compensation chambers 146 and 148 equalize the pressure between the exterior of the enclosure 128 and the sections 142 and 144, respectively. The pressure compensation fluid in source section 144 will in general have acoustic impedance properties different than those of the fluid in lens section 142. The fluid properties in lens section 142 are variables dictated by the cell acoustic properties and the frequency range desired.

The acoustic source assembly 132 generates and emits acoustic energy that can pass through an aberrating media with reduced distortion. In some situations, the aberrating media may be the metal making up a well tubular, such as a casing 150. In one embodiment, the acoustic source assembly 120 includes a transducer 152 and a lens 154. The transducer 152 may be any device configured to generate and receive sonic or ultrasonic signals. One illustrative non-limiting source may include piezoelectric elements.

The lens 154, which is better illustrated in FIGS. 9A and 9B, includes a plurality of cells 160 arranged in a grid-type manner. Each cell 160 may be shaped as a column that extends orthogonally/transversely to a direction of signal propagation, which is shown with arrow 162. The illustrated embodiment includes two sections 170, 172, each of which has a base 176 from which the cells 160 project in a cantilever-type fashion. The sections 170, 172 are arranged to mirror one another. Further, the cells 160 are aligned such that two facing cells 160 form effectively one column-like structure between the two bases 176. The facing cells 160 may be separated by a gap, contact one another, or be fixed to one another. In embodiments, one end of the cell 160 may be fixed or both ends may be fixed. The cells 160 may have any of the cross-sectional shape and structures that were discussed above and shown in FIGS. 3-5. It should be understood that the lens 154 is not limited to any particular distribution of cells 160 or that such a distribution be symmetric or conform to a particular geometric shape. It should also be understood that the lens 154 may include only one section, e.g., section 170, from which the cells 160 project. Also, the lens 154 may include an arrangement wherein two bases 148 are spanned by one cell 160 as opposed to two facing cells.

The electronics assembly 136 may include suitable electronics, microprocessors, memory modules, algorithms, power supplies, and circuitry in order to drive and sense the acoustic transducer 152. The electronics assembly 136 may also include bi-directional communication hardware in order to transmit and/or receive data signals.

Referring now to FIGS. 8-10, an illustrative mode of operation of the acoustic tool 120 involves evaluating a cement body 180 (FIG. 8), i.e., a volume of interest, that surrounds a well casing 150. The well casing may be formed of a metal, such as steel. The evaluation may include estimating a quality of the contact or bond between the cement and the well casing 150. During use, the electronics assembly 136 activates the acoustic transducer 152. In response, the acoustic transducer 152 emits acoustical waves through the lens 154 along the arrow 162. The acoustic waves may be sonic or ultrasonic and may have a narrow or wide frequency band. It should be noted that the waves enter the cells 120 along a surface facing toward the acoustic transducer surface and exit the cells 120 along a surface facing away from the acoustic transducer 152. Thereafter, the acoustical waves pass through the well case 150 and into the cement body 180. As discussed previously, the lens 154 manipulates the acoustic waves in a manner that allows these waves to pass through the metal of the well casing 150 with reduced distortion. A reflected wave 130 returns from the formation and enters the lens 154. After being manipulated by the lens 154, the wave 120 enters the transducer 152 and is processed.

Unexpectedly, the inventor discovered that the lens 154 can reduce distortion in acoustic signals that have already traveled through the aberrating media 204 as well as for acoustic signals travelling into the aberrating media 204. That is, the lens 154 can manipulate an acoustic signal emitted into the aberrating media 204 and also manipulate a reflected signal from the zone of interest 206 that has traveled through the aberrating media 204. Thus, the transducer 152 can act as a signal emitter and a signal detector.

Generally, it is desirable to evaluate a parameter or characteristic, such as a cement bond, along a complete circumference at a specified depth in the well. Thus, embodiments of the present disclosure may mount the tool 120 on a platform that is rotated by a suitable rotary device such as an electric or hydraulic motor. In some instances, the conveyance device on which the tool 120 is mounted, e.g., a drill string, may be rotated. In still other embodiments, a stationary array of two or more tools 120 may be circumferentially distributed along a plane in order to obtain full circumferential coverage.

Figure 11:
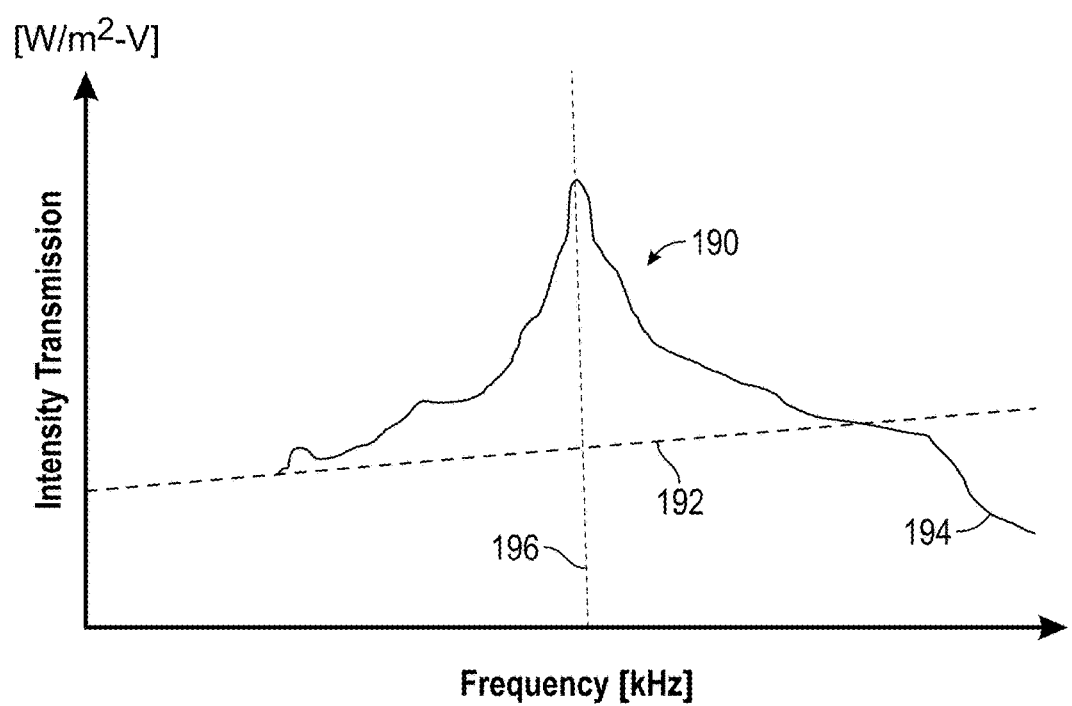
FIG. 11 is a theoretical plot of thru-casing intensity transmission of acoustic signals using and not using the teachings of the present disclosure.

Referring now to FIG. 11, there is shown an illustrative theoretical plot 190 of thru-casing intensity transmission. Line 192 illustrates the intensity of an acoustic transmission over a range of frequencies for a signal through one-half inch metal casing. This signal is transmitted directly into the one-half inch casing. Line 194 illustrates the intensity of an acoustic transmission over a range of frequencies for a signal through one-half inch metal casing. However, this signal is first manipulated by a lens as described above that has a cell with geometries as discussed above before entering the one-half inch casing. It should be noted that the line 194 demonstrates an increased signal intensity over a relatively broad frequency range. A peak 196 may occur as shown at a particular frequency. It should be appreciated, that the increased signal intensity is obtained without increasing the amplitude of the voltage signal applied to the transducer.

Figure 12B:
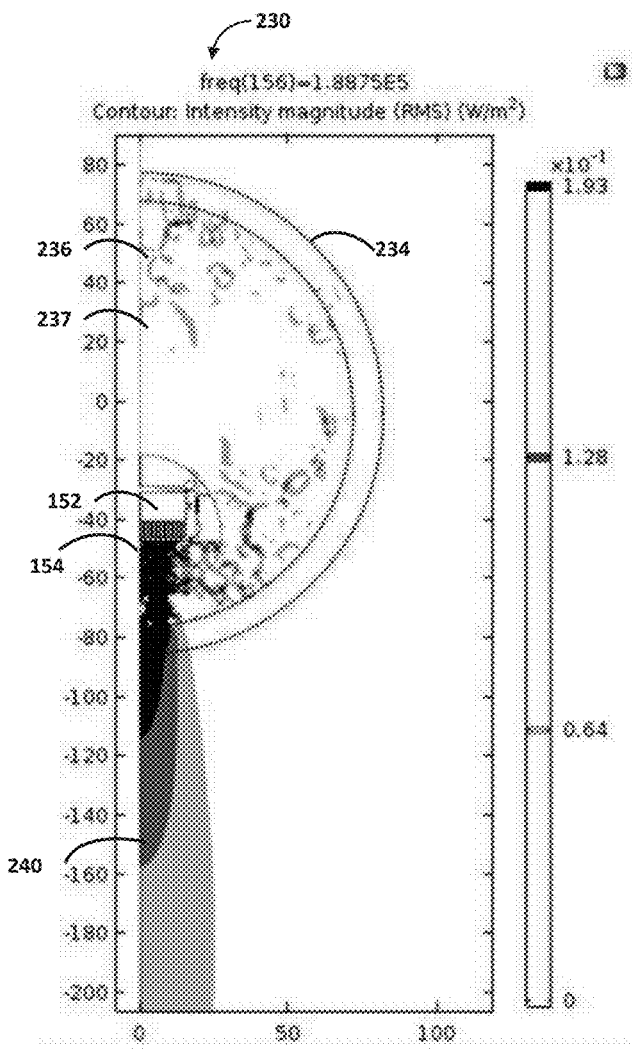
FIGS. 12 A-B illustrate acoustic intensities obtained using a transducer without and with a lens according to the present disclosure.
Figure 12A:
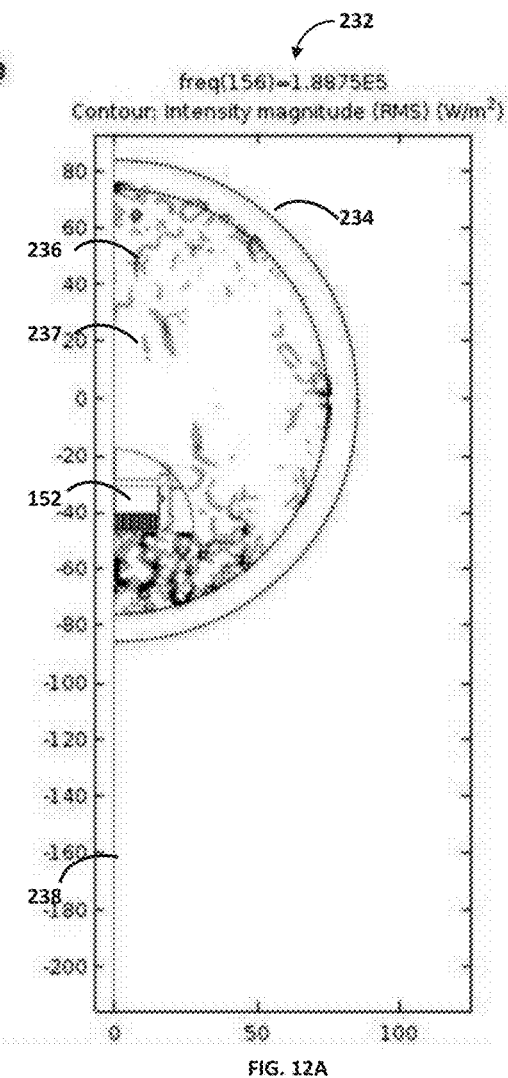

Referring now to FIG. 12A,B, there are shown graphs 230, 232, respectively, illustrating the acoustic intensity of acoustic waves emitted by a transducer 152 in a casing 234 fixed in a borehole 236 that is filled by a borehole fluid 237. The graphs 230, 232 depict an end view or top view; i.e., along a longitudinal axis of a borehole 236. Also, for simplicity, the tool modeling is done using a symmetric half-section. The dark blue areas show regions of low acoustic intensity and the dark red regions show areas of high acoustic intensity. In FIG. 12A, the transducer 152 emits a signal directly into the casing 234. The acoustic intensity in the region 238 along the radial direction from the transducer has a diffuse acoustic intensity of low magnitude, which is generally considered undesirable for acoustic imaging. In FIG. 12B, the transducer 152 emits a signal through a lens 154. As can be seen, the lens 154 creates a relatively focused zone 240 of acoustic intensity along a radial direction from the transducer 152, which is generally considered desirable for acoustic imaging. Numerical modeling suggests that the acoustic intensity in the region 240 may be an order of magnitude higher than the acoustic intensity in the region 238.

Figure 13A:
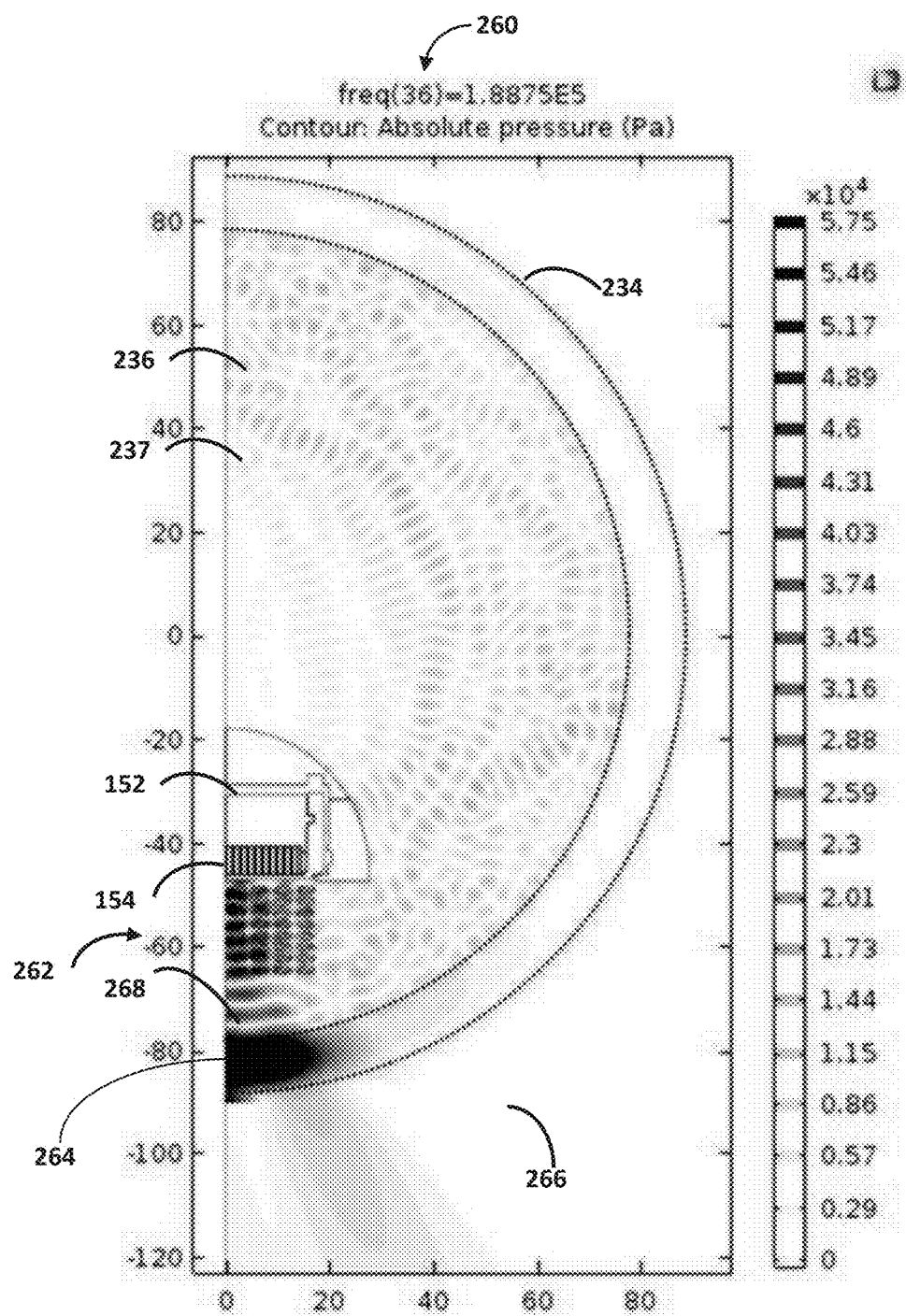
FIG. 13A illustrates an expected received signal from an anomaly reflection at the casing-cement bond interface when using embodiments of the present disclosure.

Referring now to FIG. 13A, there is shown a graph 260 illustrating a received signal 262 from an anomaly reflection at the casing-cement bond interface 264. As before, there is shown a transducer 152 in a casing 234 fixed in a borehole 236 that is filled by a borehole fluid 237. The graph 260 depicts an end view or top view; i.e., along a longitudinal axis of a borehole 236. Graph 260 is an example of the reciprocal nature of the acoustic wave manipulation with the lens 154, The right-hand side shows a contour plot of the received acoustic intensity distribution with dark blue color-coding indicating regions 266 of low intensity and dark red indicating regions 268 of high intensity.

Figure 13B:
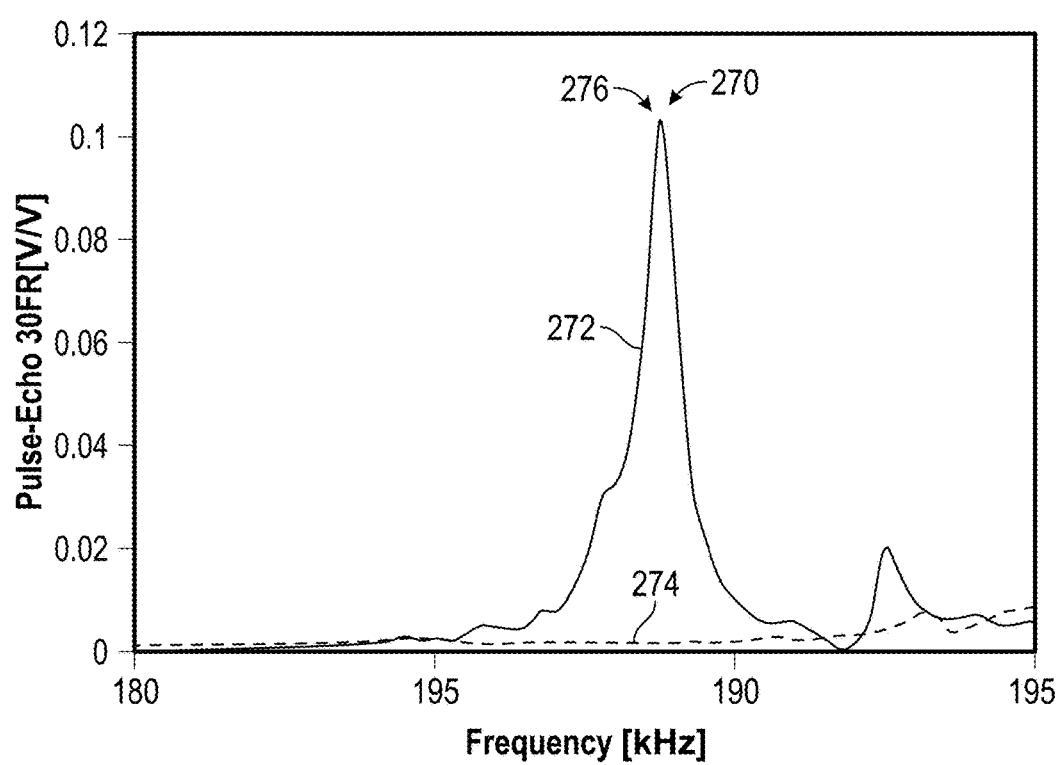
FIG. 13B illustrates an expected normalized net transmitter voltage spectrum due to the bond reflection when using embodiments of the present disclosure.

Referring to FIG. 13B, there is shown a normalized net transmitter voltage spectrum 270 due to the bond reflection. Line 272 represents the signal intensity of a thru-casing receiver with a lens according to the present disclosure and line 274 represents a signal intensity of a thru-casing receiver without such a lens. As can be seen in the region 276 of line 272, about 10% of the voltage magnitude applied to the transducer 152 (FIG. 13A) during transmission is sensed by the transducer 152 (FIG. 13A) as a received signal from the cement bond reflection 264 (FIG. 13A). This ratio of received signal to applied voltage is generally considered desirable for acoustic imaging.

While the present disclosure is discussed in the context of a hydrocarbon producing well, it should be understood that the present disclosure may be used in any borehole environment (e.g., a water or geothermal well). Also, embodiments may be used in acoustic tools used at the surface or in bodies or water.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. An apparatus for investigating a subsurface volume, comprising:
    an enclosure configured to be conveyed along a wellbore formed through the subsurface volume;
    an acoustic transducer disposed in the enclosure and generating acoustical signals;
    an electronics assembly disposed in the enclosure and controlling the acoustic transducer; and
    a lens assembly disposed in the enclosure and next to the acoustic transducer, the lens assembly being positioned to receive the generated acoustical signals from the acoustic transducer, the lens assembly being formed of a plurality of cells, each cell formed as a column oriented transverse to a direction of travel of the acoustical signals, each cell having a hub, a plurality of spokes radiating from the hub, and a plurality of fingers circumferentially distributed around the hub, wherein the hub, spokes, and fingers are oriented to cause the acoustic waves to travel at a different speed in each of three orthogonal directions, and wherein the lens assembly is further positioned to direct the acoustic waves into the subsurface volume.

2. The apparatus of claim 1, wherein the plurality of cells are arranged in a grid projecting from a common base.

3. The apparatus of claim 1, wherein the hub is formed of a plurality of structurally independent sections, wherein each section has a set of the plurality of spokes, and wherein each set of the plurality of spokes are structurally independent to one another.

4. The apparatus of claim 1, wherein the hub and the plurality of spokes are aligned along a plane.

5. The apparatus of claim 4, wherein a thickness of at least two fingers of the plurality of fingers varies non-linearly along the plane.

6. The apparatus of claim 1, wherein:
    the hub, the plurality of spokes, and the plurality of fingers are divided to form a plurality of structurally independent cell segments;
    the plurality of fingers are radially staggered to nest between one another; and
    the hub, the plurality of spokes, and the plurality of fingers all lie along the same plane.

7. The apparatus of claim 1, further comprising a rotary device rotating the enclosure.

8. The apparatus of claim 1, wherein a metamaterial created by the plurality of cells deforms with a different bulk moduli in each of the three orthogonal directions.

9. A method for investigating a subsurface volume, comprising:
    positioning an acoustic tool in a wellbore, the acoustic tool including:
        an enclosure configured to be conveyed along a wellbore;
        an acoustic transducer disposed in the enclosure and generating acoustical signals;
        an electronics assembly disposed in the enclosure and controlling the acoustic transducer; and
        a lens assembly disposed in the enclosure and next to the acoustic transducer, the lens assembly being formed of a plurality of cells, each cell formed as a column oriented transverse to a direction of travel of the acoustical signals, each cell having a hub, a plurality of spokes radiating from the hub, and a plurality of fingers circumferentially distributed around the hub, wherein the hub, spokes, and fingers are oriented to cause the acoustic waves to travel at a different speed in each of three orthogonal directions; and directing the acoustic waves through an adjacent aberrating media that at least partially blocks the direction of travel of the acoustic waves to the volume of interest.

10. The method of claim 9, wherein the aberrating media is a metal tubular.

11. The method of claim 10, wherein the volume of interest is cement.

12. The method of claim 11, further comprising estimating quality of a cement bond between the cement and the metal tubular.

13. The method of claim 9, further comprising rotating the acoustic tool.

14. The method of claim 9, further comprising using the acoustic transducer to detect a reflected signal from the zone of interest that has traveled through the aberrating media and the lens assembly.

* * * * *